No. 850,007. PATENTED APR. 9, 1907.
F. M. HUNTOON.
LAWN SPRINKLER.
APPLICATION FILED JULY 15, 1905.
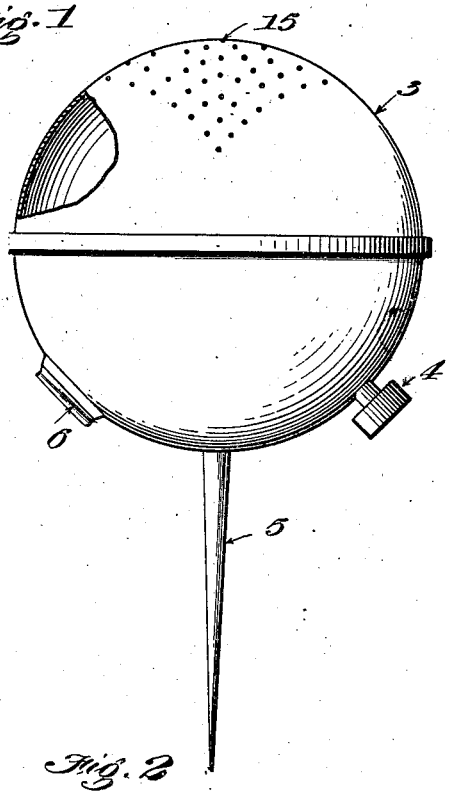
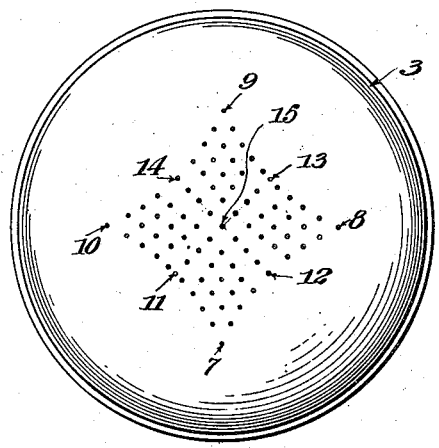
Witnesses
Inventor
Fred M. Huntoon
By Havard T. Harpham
Attorneys

UNITED STATES PATENT OFFICE.

FRED M. HUNTOON, OF RIVERSIDE, CALIFORNIA.

LAWN-SPRINKLER.

No. 850,007.   Specification of Letters Patent.   Patented April 9, 1907.

Application filed July 15, 1905. Serial No. 269,839.

*To all whom it may concern:*

Be it known that I, FRED M. HUNTOON, a citizen of the United States, residing at Riverside, in the county of Riverside and State of California, have invented new and useful Improvements in Lawn-Sprinklers, of which the following is a specification.

It is the object of my lawn-sprinkler to be able to sprinkle the surface of the ground or lawn in shape of a square or parallelogram, thereby enabling me to sprinkle a certain area of ground or lawn adjacent to a walk or building without having the water touch the walk or building. I accomplish this object by means of the sprinkler described herein and illustrated in the accompanying drawings, in which—

Figure 1 is a side elevation of the preferred form of my improved sprinkler. Fig. 2 is a plan of the same.

In the drawings the body 3 of my sprinkler is preferably a hollow globe and is provided with an attachment 4, by means of which a hose is connected to the sprinkler. A spear 5, attached to the body, provides means to hold the body in a vertical position. A removable screw-cap 6 provides means by which dirt or other impurities which may enter the center of the body may be cleaned out. The screw-cap is removed, and the water being turned on will quickly wash dirt or other impurities from within the body. When it is desired to have a sprinkler that will sprinkle a square area of lawn or ground, the upper or top surface of the globe is perforated by perforations preferably arranged in rows, as shown. In making these rows the outermost rows are fixed on lines that form arcs of a circle. The outer or end perforations 7, 8, 9, and 10 of the outermost rows are placed equidistant from each other and distant from the horizontal circumferential line of the globe one-eighth of the circumference thereof. The perforations 11, 12, 13, and 14 are respectively equidistant from the outer or end perforations and are at a point distant from the topmost point or apex 15 of the globe equal to one-sixteenth of the circumference of the globe. The perforations within the outer rows are also preferably on the arc of a circle, but not necessarily so. When it is desired to sprinkle an area of lawn in the shape of a parallelogram, the outer rows of perforations are all on the arc of a circle; but those on opposite sides will be respectively nearer to the apex and farther away from the apex of the globe, depending upon the required length and width of the parallelogram.

It will be understood that the apex of the globe is the central point directly above the spear, which is inserted into the ground to hold the globe in a vertical position. It will also be understood that it is only necessary that the upper half of the sprinkler should be semispherical; but I prefer to have the whole sprinkler in the form of a globe and that the two halves should be soldered together; but, if desired, they may be screwed together, in which case the cleaning-cap 6 could be omitted.

Having described my invention, what I claim as new, and desire to secure by Letters Patent, is—

1. A sprinkler comprising a hollow body, the upper half of which is hemispherical, said upper portion having perforations in the upper portion thereof, the outermost rows of which perforations are arranged on the arc of a circle, the end perforations of each row being equidistant from each other and distant from the horizontal or base line of the hemispherical portion the one-eighth of the circumference of the globe of which the upper portion forms one-half, the central perforations of said outer rows being equidistant from the end perforations and one-half closer to the apex of the top than the end perforations.

2. As an article of manufacture, a sprinkler comprising a hollow body having a convex or curved outer surface, the center or apex of such surface having perforations therein, in the general form of a rectangular figure, the corners of which extend opposite each other on the opposite sides of the surface so that the jets of water issuing from the perforations extend approximately all the way from horizontal at the extreme points to vertical at the apex of the dome or convex surface.

In witness that I claim the foregoing I have hereunto subscribed my name this 24th day of June, 1905.

FRED M. HUNTOON.

Witnesses:
 G. E. HARPHAM,
 HENRY T. HAZARD.